(12) United States Patent
Miura et al.

(10) Patent No.: US 8,018,802 B2
(45) Date of Patent: Sep. 13, 2011

(54) INFORMATION RECORDING MEDIUM, INFORMATION RECORDING APPARATUS AND METHOD, AND COMPUTER PROGRAM

(75) Inventors: Masahiro Miura, Saitama (JP); Keiji Katata, Saitama (JP); Masahiro Kato, Saitama (JP); Eiji Muramatsu, Saitama (JP); Masayoshi Yoshida, Saitama (JP); Takeshi Koda, Saitama (JP); Shoji Taniguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 594 days.

(21) Appl. No.: 12/158,494

(22) PCT Filed: Dec. 20, 2006

(86) PCT No.: PCT/JP2006/325384
§ 371 (c)(1),
(2), (4) Date: Jun. 27, 2008

(87) PCT Pub. No.: WO2007/072860
PCT Pub. Date: Jun. 28, 2007

(65) Prior Publication Data
US 2009/0279402 A1    Nov. 12, 2009

(51) Int. Cl.
*G11B 15/52*    (2006.01)
(52) U.S. Cl. ............... 369/47.36; 369/94; 369/47.49
(58) Field of Classification Search ........... 369/47.36, 369/47.49
See application file for complete search history.

(56) References Cited

U.S. PATENT DOCUMENTS

| | | | | |
|---|---|---|---|---|
| 7,539,111 B2 * | 5/2009 | Ishida et al. | | 369/59.25 |
| 7,729,218 B2 * | 6/2010 | Tokiwa et al. | | 369/47.53 |
| 2002/0136134 A1 * | 9/2002 | Ito et al. | | 369/53.36 |
| 2005/0147002 A1 * | 7/2005 | Hwang et al. | | 369/47.14 |
| 2006/0083141 A1 * | 4/2006 | Teranishi et al. | | 369/53.24 |

FOREIGN PATENT DOCUMENTS

| | | |
|---|---|---|
| JP | 2002-313032 | 10/2002 |
| JP | 2005-222628 | 8/2005 |
| WO | WO 2004003897 A1 * | 1/2004 |

OTHER PUBLICATIONS

International Search Report PCT/JP2006/325384.

* cited by examiner

*Primary Examiner* — Lixi C Simpson
(74) *Attorney, Agent, or Firm* — Young & Thompson

(57) ABSTRACT

An information recording apparatus is for recording user data and recording management data onto an information recording medium being provided with: a first recording layer; and a second recording layer, each of the first recording layer and the second recording layer having a user data area to record therein at least the user data and a recording management area to record therein at least the recording management data for managing recording of the user data, the information recording apparatus is provided with: a recording device for dividing the recording management area into a plurality of recording management segments and for recording the recording management data into at least one of the plurality of recording management segments; and a first controlling device for controlling the recording device to dispose each of the plurality of recording management segments in a single recording layer.

13 Claims, 11 Drawing Sheets

[FIG. 1]
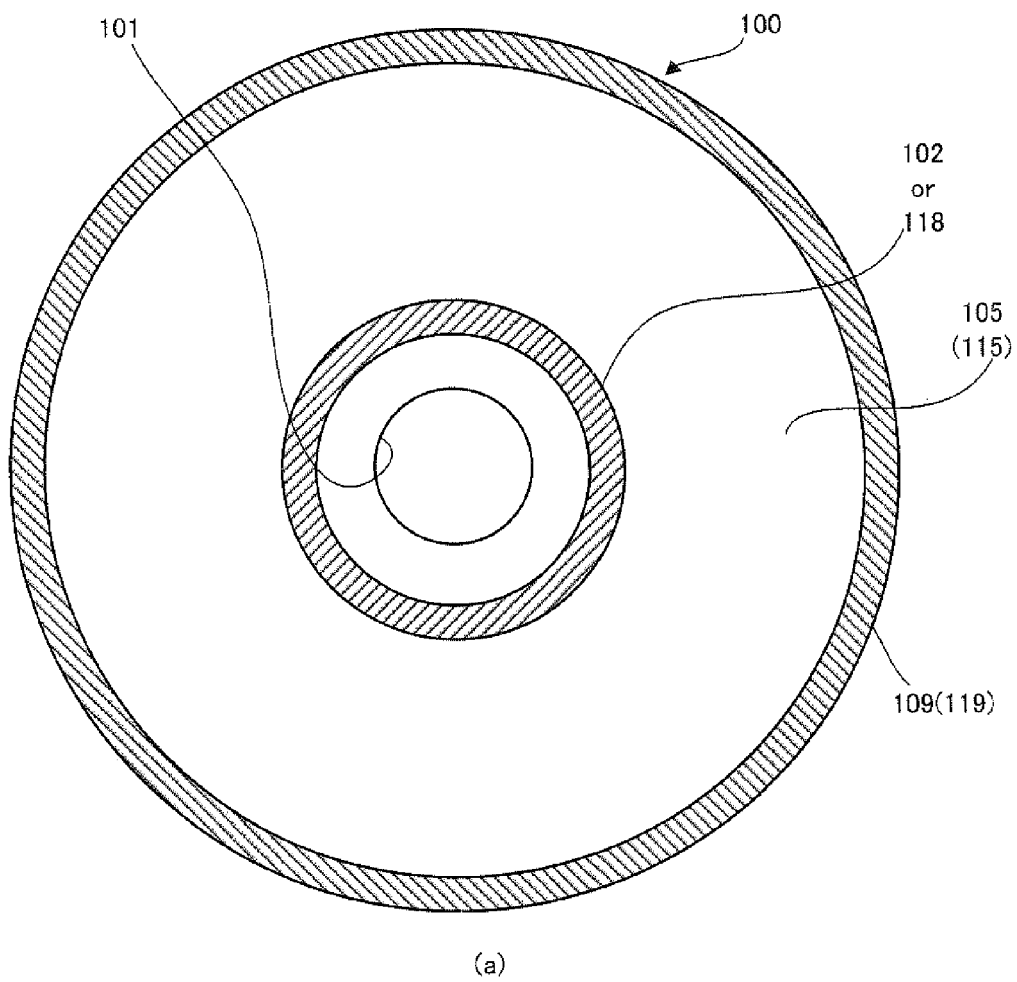
(a)
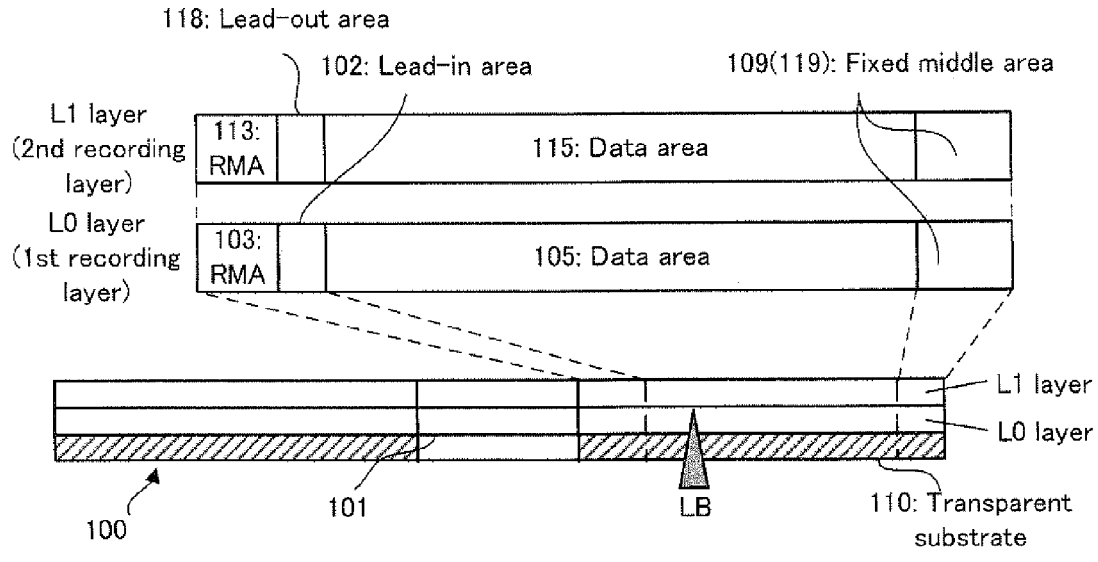
(b)

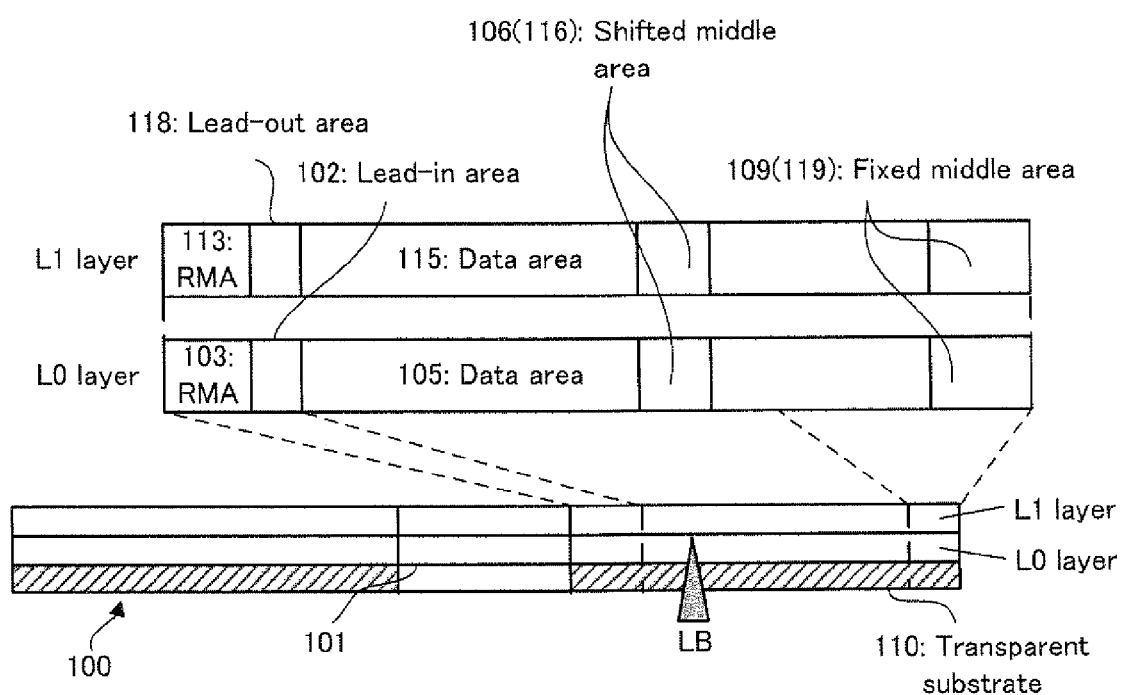

[FIG. 3]
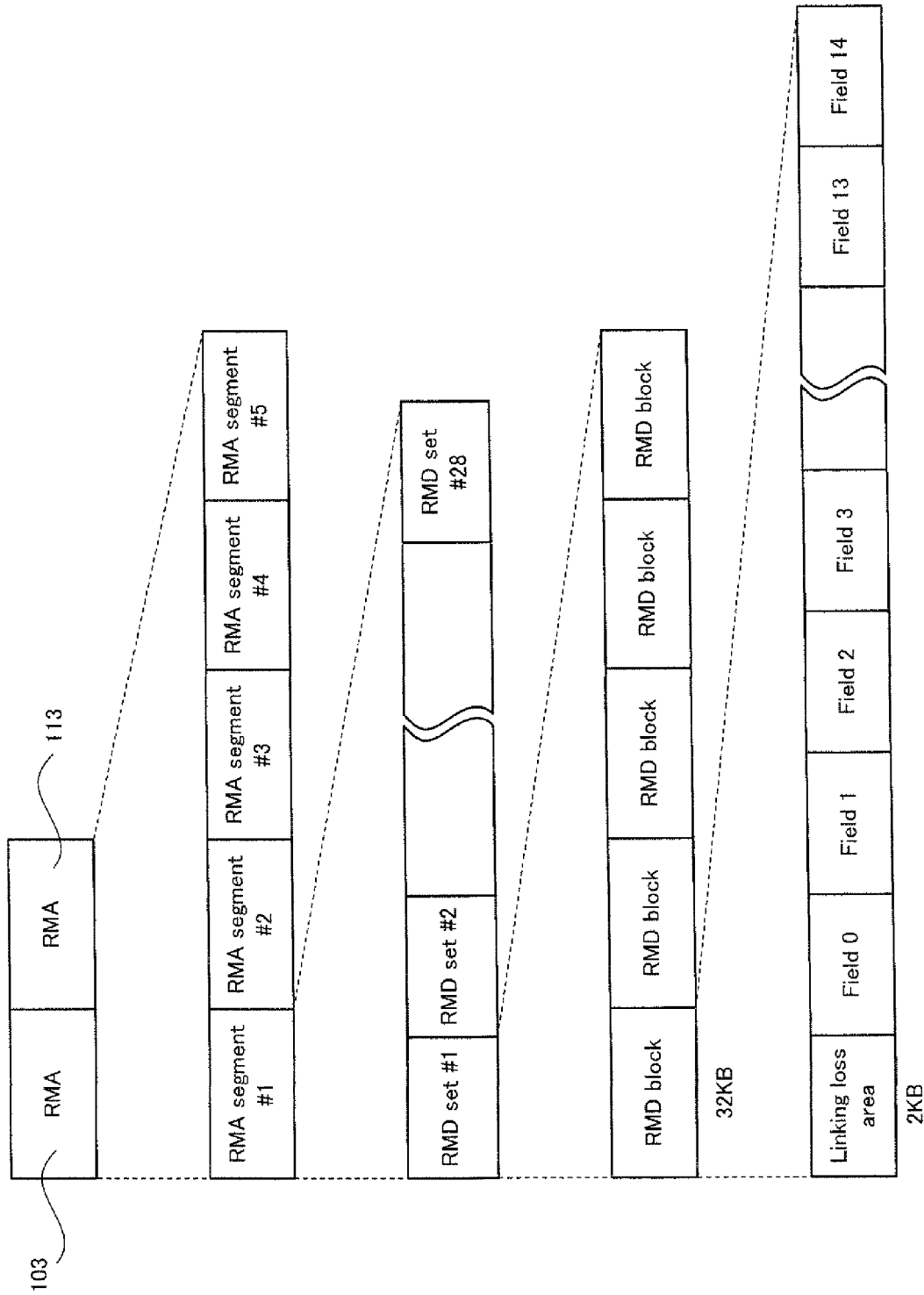

[FIG. 4]

| Sector NO. | Field NO. | Format 2 RMD | Format 3 RMD |
|---|---|---|---|
| 0 | Linking loss area | Linking loss area | |
| 1 | 0 | Common information | |
| 2 | 1 | Pointer to RMD set | OPC related information |
| 3 | 2 | | User specific data |
| 4 | 3 | | Recording status information |
| 5 | 4 | | |
| 6 | 5 | | |
| 7 | 6 | | |
| 8 | 7 | | |
| 9 | 8 | Reserved area | Defect status bit map |
| 10 | 9 | | |
| 11 | 10 | | |
| 12 | 11 | | |
| 13 | 12 | | |
| 14 | 13 | | Drive specific information |
| 15 | 14 | | Disc testing area information |

[FIG. 5]

| BP | Content | Number of bytes |
|---|---|---|
| 0 | Format operation code | 1 byte |
| 1 | Reserved | 1 byte |
| 2 to 5 | Formation information #1 | 4 bytes |
| 6 to 9 | Formation information #2 | 4 bytes |
| 10 to 255 | Reserved | 54 bytes |
| 256 to 257 | Last Rzone number | 2 bytes |
| 258 to 261 | Start sector number of RZone | 4 bytes |
| 262 to 265 | End sector number of RZone | 4 bytes |
| 266 to 511 | Reserved | 4 bytes |
| 512 to 515 | Layer jump address in L0 layer | 4 bytes |
| 516 to 519 | Last recording address | 4 bytes |
| 520 to 523 | Previous layer jump address in L0 layer | 4 bytes |
| 524 to 525 | Jump interval | 2 bytes |
| 526 to 2047 | Reserved | 1522 bytes |

[FIG. 6]
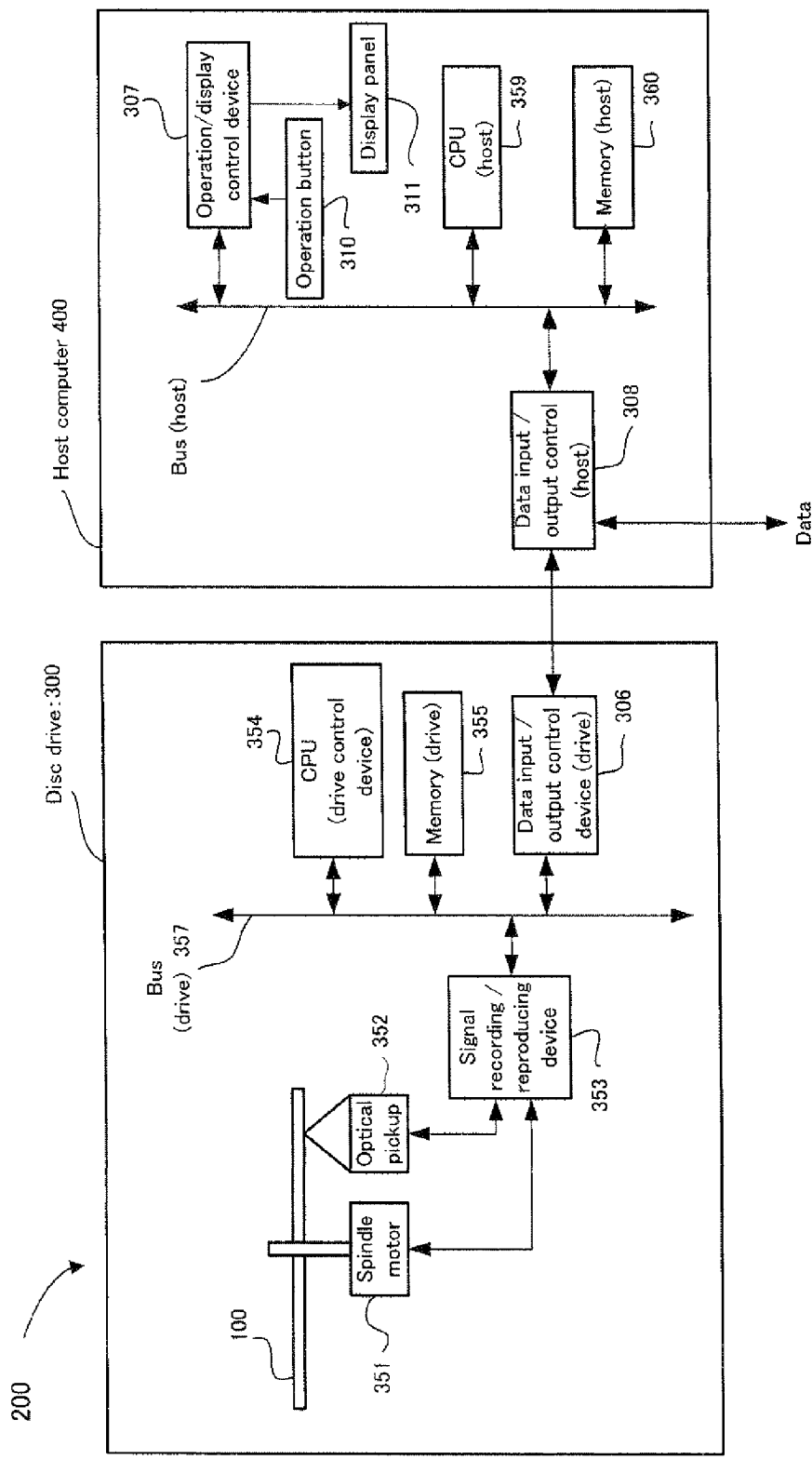

[FIG. 7]
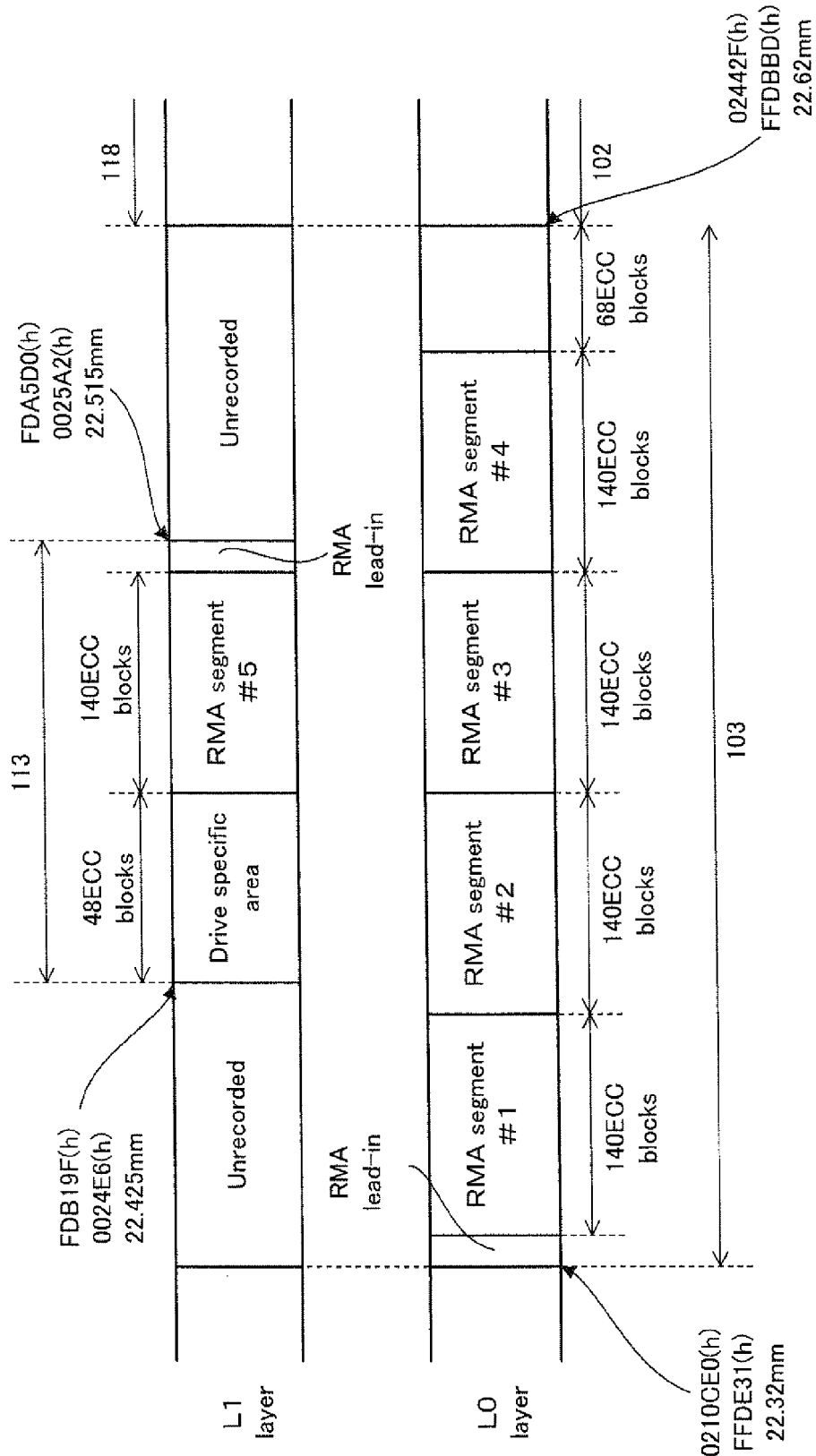

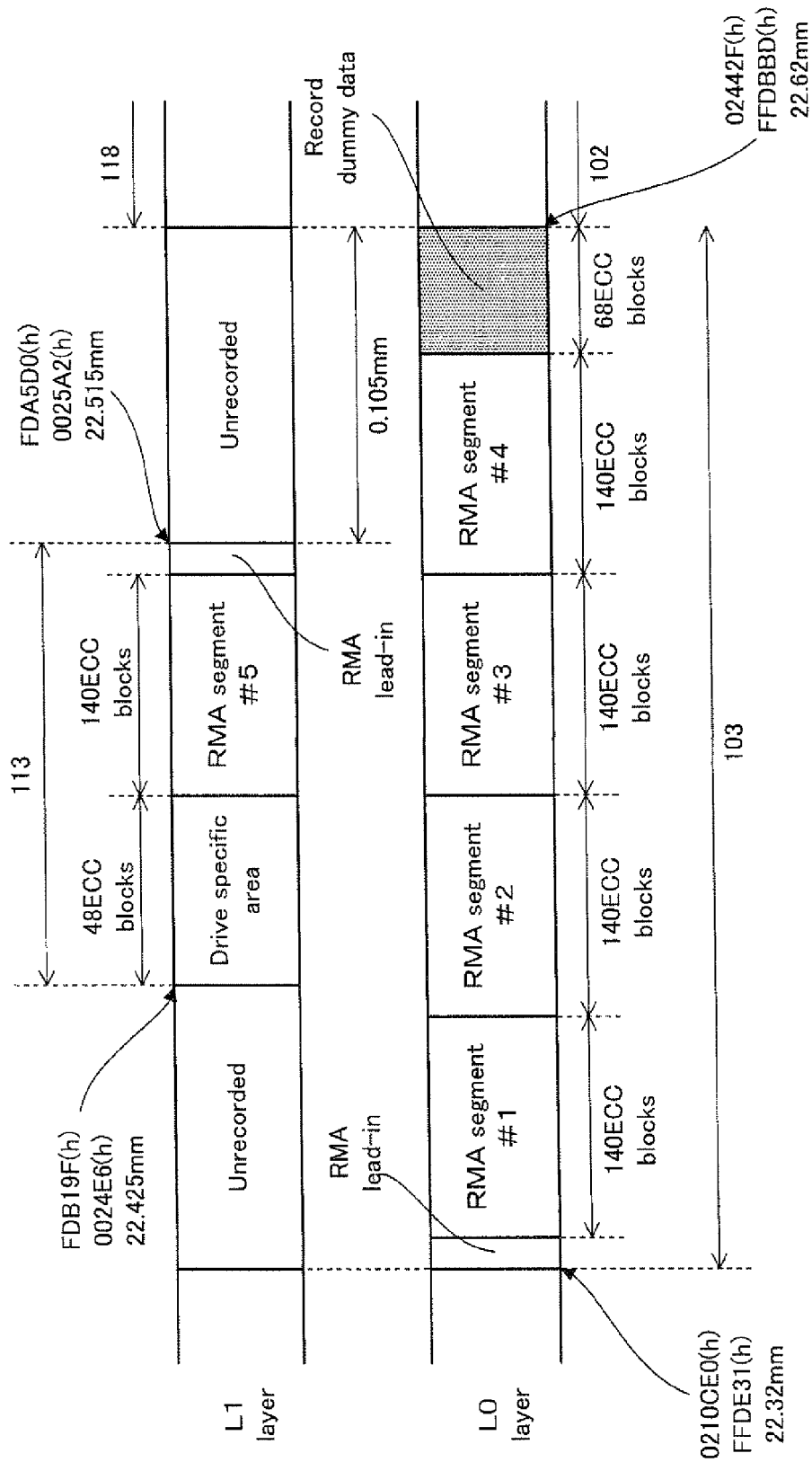
[FIG. 8]

[FIG. 9]
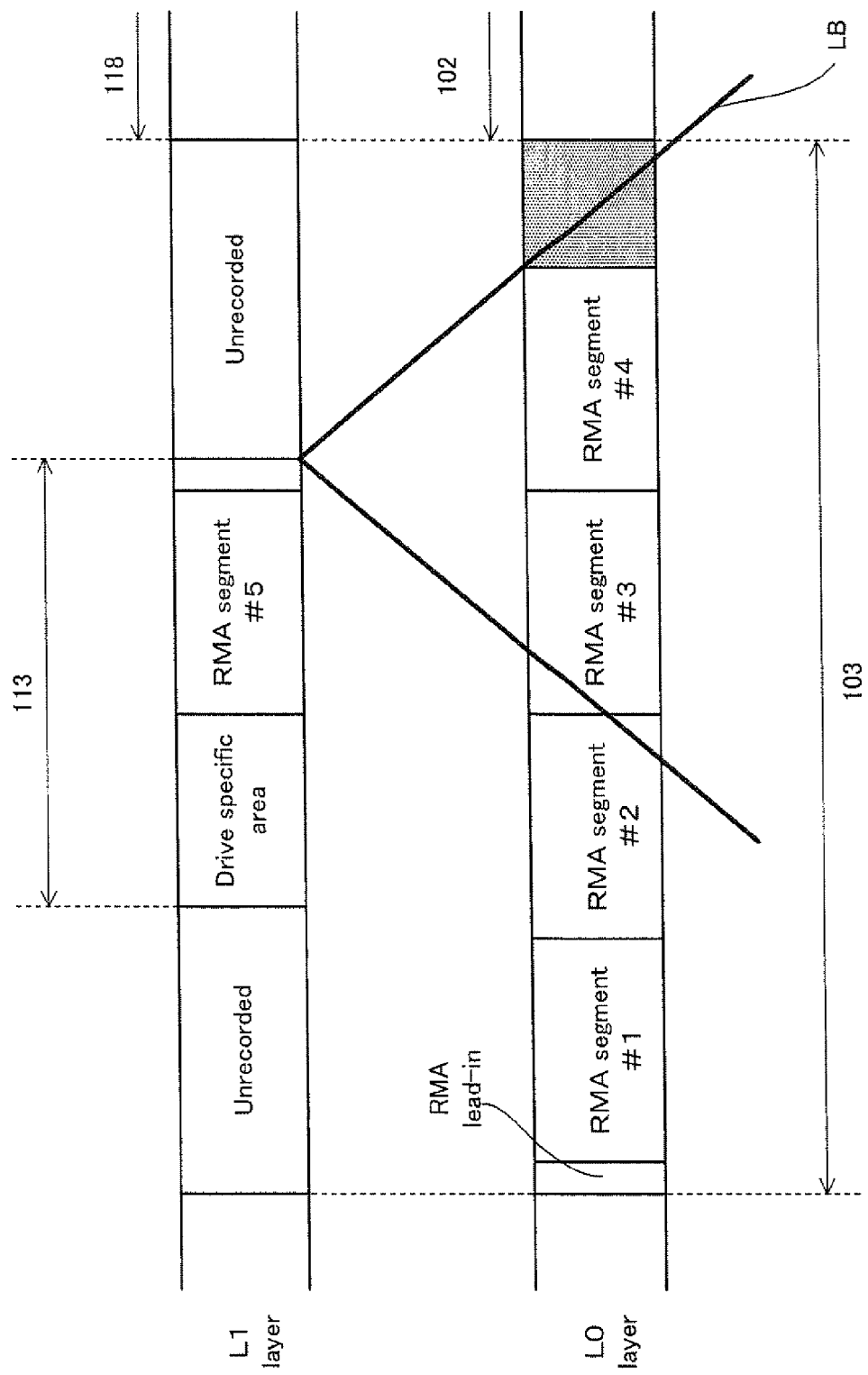

[FIG. 10]
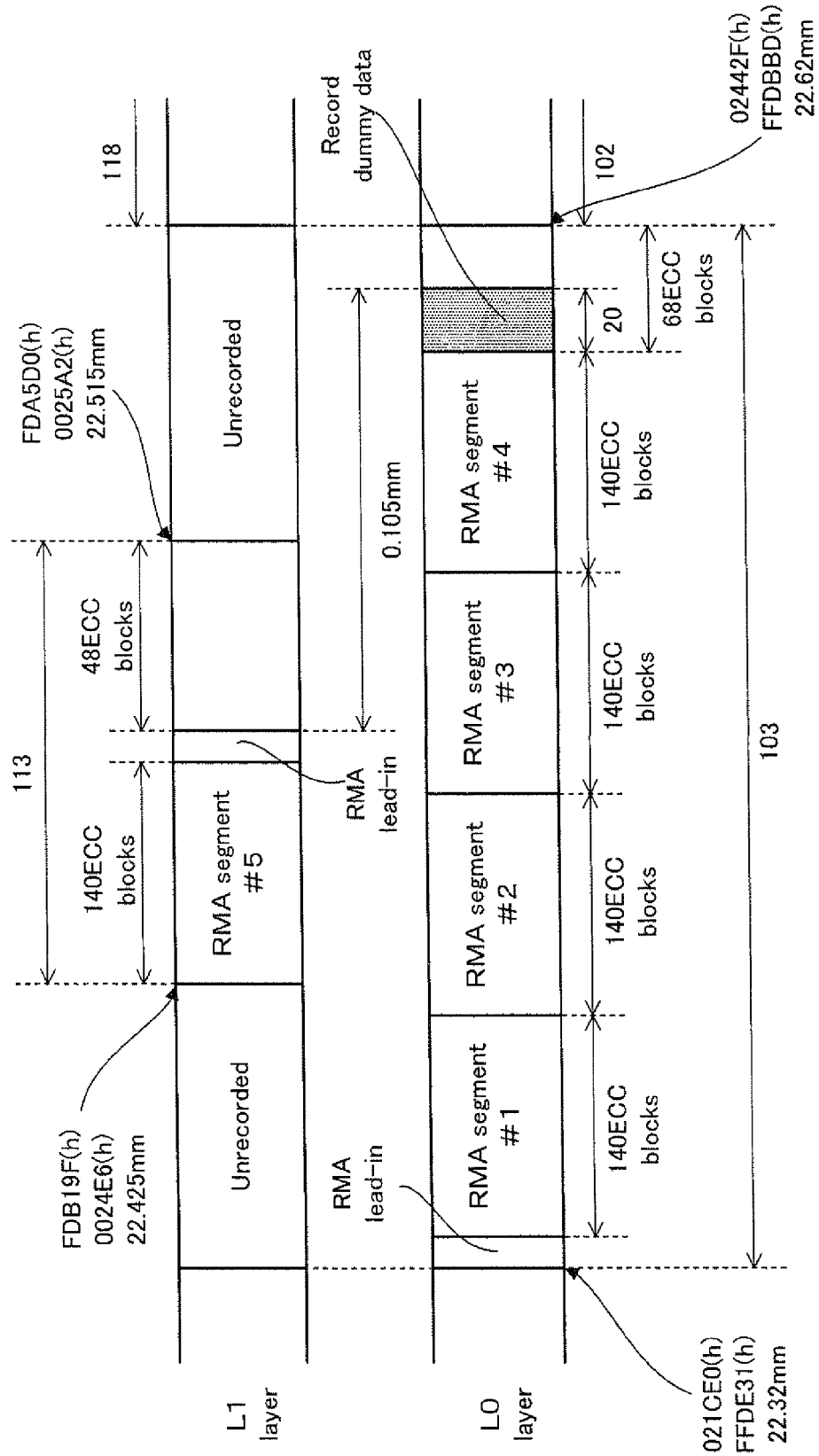

[FIG. 11]
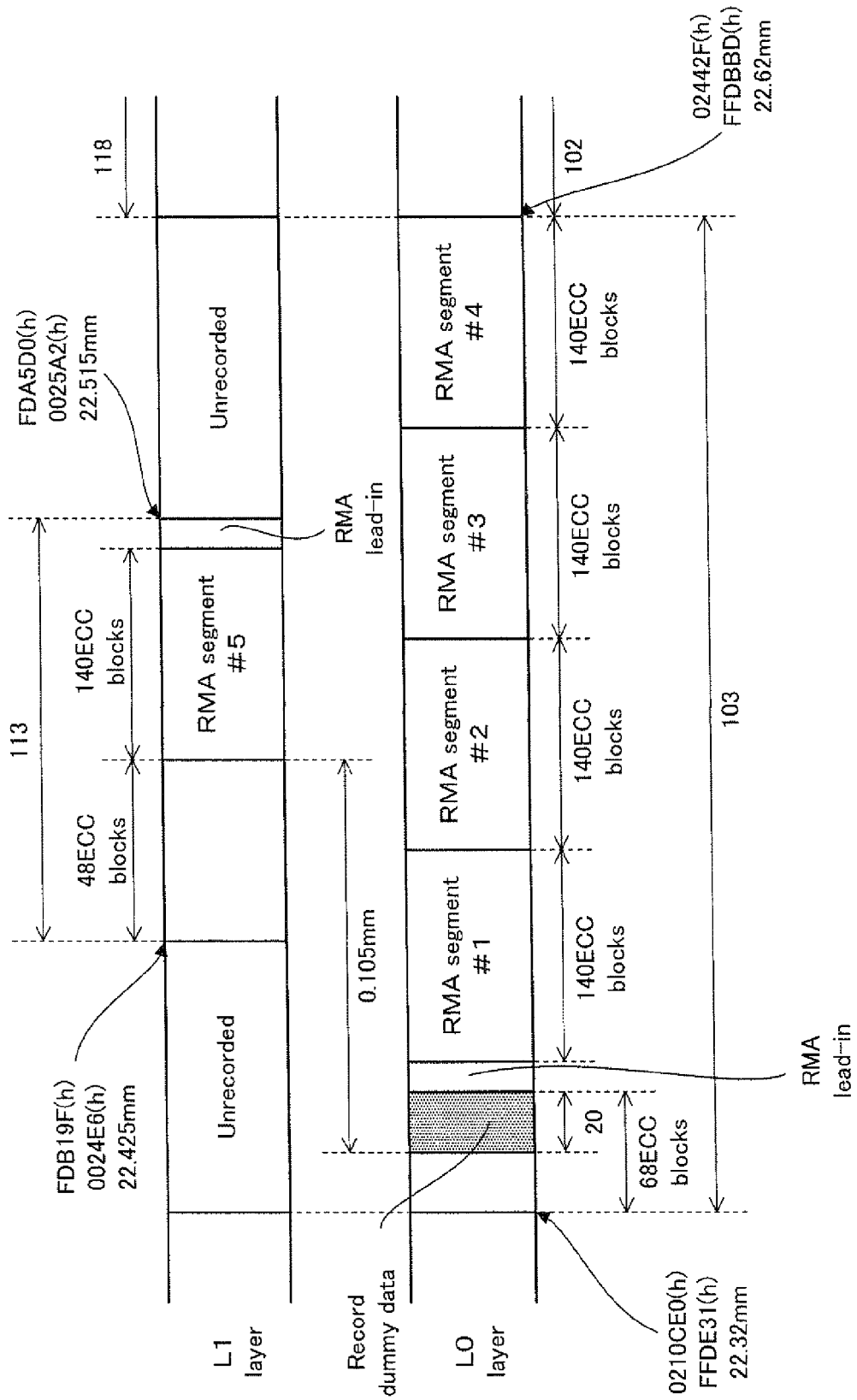

INFORMATION RECORDING MEDIUM, INFORMATION RECORDING APPARATUS AND METHOD, AND COMPUTER PROGRAM

TECHNICAL FIELD

The present invention relates to an information recording medium, such as a DVD, an information recording apparatus and method, such as a DVD recorder, and a computer program which makes a computer function as the information recording apparatus.

BACKGROUND ART

In an information recording medium, such as a DVD-ROM (DVD-Read Only Memory), a DVD-R (DVD-Recordable), and a BD-ROM, there is also developed a multilayer type or dual-layer type optical disc or the like on which a plurality of recording layers are laminated or bonded on a same substrate, as described in a patent document 1 or the like. Moreover, if recording is performed on the dual-layer type, i.e. two-layer type optical disc, e.g. a two-layer type DVD-R disc, an information recording apparatus, such as a DVD recorder, focuses a laser beam for recording on a recording layer located on the front side (i.e. on the closer side to an optical pickup) viewed from the irradiation side of the laser beam (referred to as a "L0 layer" as occasion demands in the application), to thereby record data into the L0 layer in a heat change recording method (in other words, an irreversible recording method), and it focuses the laser beam, through the L0 layer or the like, on a recording layer located on the rear side (i.e. on the farther side from the optical pickup) viewed from the irradiation side of the laser beam (referred to as a "L1 layer" as occasion demands in the application), to thereby record information into the L1 layer in the heat change recording method. On the other hand, if the recording is performed on a two-layer type DVD-RW disc, the information recording apparatus, such as a DVD recorder, focuses the laser beam for recording on the L0 layer, to thereby record data into the L0 layer in a phase change recording method (in other words, a reversible recording method), and it focuses the laser beam on the L1 layer through the L0 layer, to thereby record information into the L1 layer in the phase change recording method.

In the information recording medium on which the plurality of recording layers are laminated, there has been developed a technology of maintaining data reliability against scratches or the like by recording disc volume information on the inner circumferential side of the L0 layer and the outer circumferential side of the L1 layer (refer to a patent document 1).

On the other hand, in recording information onto the information recording medium, recording management data (RMD) for managing the information recording is recorded into a recording management area (RMA) disposed on the information recording medium. As a method of using the RMA, for example, in case of write-once one-layer type and two-layer type DVD-R discs, the RMD is updated by writing once the new RMD. Moreover, in case of a rewritable one-layer DVD-RW disc, as the method of using the RMA, in addition to the above method, such a method is employed that the RMA is used for each RMA segment obtained by dividing the RMA. One RMA segment is used for each RMD set, obtained by dividing the RMA segment. Then, the RMD that is valid (in other words, latest) is recorded into the RMD set, except the head of the RMA segment, and a pointer which indicates the position of the RMD set in which the valid RMD is recorded is recorded into the RMD set, located at the head of the RMA segment. That is, in order to read the valid RMD, firstly, the pointer is obtained by referring to the RMD set which is located at the head of the RMA segment, and the valid RMD is read from the RMD set indicated by the pointer. Moreover, by the same operation, the RMD is updated in the RMD set in which the valid RMD is recorded.

Patent document 1: Japanese Patent Application Laid Open NO. 2005-222628

DISCLOSURE OF INVENTION

Subject to be Solved by the Invention

In the information recording medium on which the plurality of recording layers are laminated, the RMA is provided for each of the L0 layer and the L1 layer. Thus, in the using method which divides the RMA for each RMA segment, one RMA segment could be disposed over the L0 layer and the L1 layer, depending on the size of the RMA in each of the L0 layer and the L1 layer and the size of the RMA segment. By this, the RMD set located at the head of the RMA segment could be disposed in the L0 layer, and the RMD sets other than the RMD set which is located at the head of the RMA segment could be disposed in the L1 layer. In this case, in order to read the valid RMD or updated the RMD, it is necessary to perform layer jump after obtaining the pointer from the RMD set disposed in the L0 layer. However, the layer jump requires a certain amount of time, which increases a time required to read the valid RMD or to update the RMD.

Moreover, if the pointer is updated in addition to the updating of the RMD, a recording operation needs to be continuously performed on each of the L0 layer and the L1 layer. In general, an optimum recording power which is used to record the information into the L0 layer differs from the optimum recording power which is used to record the information into the L1 layer. Thus, if an information recording apparatus recognizes only one of the optimum recording powers, the other optimum recording power needs to be calculated. This may also lead to an increase in the time required to read the valid RMD or to update the RMD.

In view of the aforementioned conventional problems, it is therefore an object of the present invention to provide an information recording apparatus and method which can preferably record the recording management data, a computer program which makes a computer function as the information recording apparatus, and an information recording medium.

Means for Solving the Subject

The above object of the present invention can be achieved by an information recording apparatus for recording user data and recording management data onto an information recording medium provided with: a first recording layer; and a second recording layer, each of the first recording layer and the second recording layer having a user data area to record therein at least the user data and a recording management area to record therein at least the recording management data for managing recording of the user data, the information recording apparatus provided with: a recording device for dividing the recording management area into a plurality of recording management segments and for recording the recording management data into at least one of the plurality of recording management segments; and a first controlling device for controlling the recording device to dispose each of the plurality of recording management segments in a single recording layer.

The above object of the present invention can be also achieved by an information recording method of recording user data and recording management data onto an information recording medium provided with: a first recording layer; and a second recording layer, each of the first recording layer and the second recording layer having a user data area to record therein at least the user data and a recording management area to record therein at least the recording management data for managing recording of the user data, the information recording method provided with: a recording process of dividing the recording management area into a plurality of recording management segments and for recording the recording management data into at least one of the plurality of recording management segments; and a first controlling process of controlling the recording process to dispose each of the plurality of recording management segments in a single recording layer.

The above object of the present invention can be also achieved by a computer program for recording control and for controlling a computer provided in the information recording apparatus of the present invention described above, the computer program making the computer function as at least one portion of the recording device and the first controlling device.

The above object of the present invention can be also achieved by an information recording medium provided with: a first recording layer; and a second recording layer, each of the first recording layer and the second recording layer having a user data area to record therein at least the user data and a recording management area to record therein at least the recording management data for managing recording of the user data, wherein the second recording management area is divided into a plurality of recording management segments, the recording management data is recorded into one of the plurality of recording management segments, and an area to record therein the plurality of recording management segments is provided such that each of the plurality of recording management segments is disposed in a single layer.

These effects and other advantages of the present invention will become more apparent from the embodiments explained below.

BRIEF DESCRIPTION OF DRAWINGS

FIG. 1 are a substantial plan view showing the basic structure of an optical disc in an example, a schematic cross sectional view showing the optical disc, and its corresponding schematic conceptual view showing a recording area structure in the radial direction.

FIG. 2 is a schematic cross sectional view showing the optical disc, and its corresponding schematic conceptual view showing the recording area structure in the radial direction.

FIG. 3 is a data structure diagram conceptually showing the data structure of RMD to be recorded into a RMA.

FIG. 4 is a data structure diagram conceptually showing the data structure of each of fields which constitute the RMD, with regard to a format 2 and a format 3.

FIG. 5 is a data structure diagram conceptually showing the data structure of a field 3 of the RMD in the format 3.

FIG. 6 is a block diagram conceptually showing the basic structure of an information recording/reproducing apparatus in an example.

FIG. 7 is a data structure diagram conceptually showing an aspect of using the RMA.

FIG. 8 is a data structure diagram conceptually showing one aspect of recording dummy data into an unrecorded area which is generated in the RMA in the L0 layer.

FIG. 9 is a cross sectional view conceptually showing an aspect of irradiating a laser beam LB when the RMD is recorded into the RMA in the L1 layer in the condition of FIG. 8.

FIG. 10 is a data structure diagram conceptually showing another aspect of recording the dummy data into the unrecorded area which is generated in the RMA in the L0 layer.

FIG. 11 is a data structure diagram conceptually showing another aspect of recording the dummy data into the unrecorded area which is generated in the RMA in the L0 layer.

DESCRIPTION OF REFERENCE CODES 100 optical disc
102 lead-in area
103, 113 RMA
105, 115 data area
106, 116 shifted middle area
109, 119 fixed middle area
118 lead-out area
200 information recording/reproducing apparatus
300 disc drive
352 optical pickup
353 signal recording/reproducing device
354 CPU
400 host computer

BEST MODE FOR CARRYING OUT THE INVENTION

Hereinafter, the best mode for carrying out the invention will be explained in each embodiment in order, with reference to the drawings.

Embodiment of Information Recording Apparatus

An embodiment of the information recording apparatus of the present invention is an information recording apparatus for recording user data and recording management data onto an information recording medium provided with: a first recording layer; and a second recording layer, each of the first recording layer and the second recording layer having a user data area to record therein at least the user data and a recording management area to record therein at least the recording management data for managing recording of the user data, the information recording apparatus provided with: a recording device for dividing the recording management area into a plurality of recording management segments and for recording the recording management data into at least one of the plurality of recording management segments; and a first controlling device for controlling the recording device to dispose each of the plurality of recording management segments in a single recording layer.

According to the information recording apparatus of the present invention, by the operation of the recording device, the user data including various contents, such as a movie and audio, is recorded into the user data area, provided for each of the first recording layer and the second recording layer.

Moreover, by the operation of the recording device, the recording management data for managing the recording of the user data is recorded into the recording management area, provided for each of the first recording layer and the second recording layer. At this time, the recording management area is divided into the plurality of recording management segments. Then, the recording management data is recorded into one of the plurality of recording management segments. If the recording management data cannot be recorded into a certain recording management segment because of a defect or the like, the recording management data is recorded into a new recording management segment.

In the embodiment, in particular, each of the plurality of recording management segments is disposed in the single recording layer. In other words, each of the plurality of recording management segments is not disposed over the plurality of recording layers.

By this, by using each of the recording management segments disposed in the single recording layer, the recording management data can be recorded. That is, if the recording management data is recorded into the recording management segment disposed in the first recording layer or the second recording layer, it is unnecessary to change the recording layer into which the recording management data is recorded as long as the recording management segment is used. Therefore, in recording or reading the recording management data, it is unnecessary to perform an operation for changing the recording layer which is a target of the recording operation. By this, it is possible to relatively reduce a time required for the recording or the reading of the recording management data.

In addition, since it is unnecessary to change the recording layer into which the recording management data is recorded, it is also unnecessary to change a recording power in recording the recording management data. Thus, if an optimum recording power for the recording layer which is the target for recording the recording management data is recognized, there is no need to recognize an optimum recording power for another recording layer. That is, it is unnecessary to calculate the optimum recording power for another recording layer. By this, it is possible to relatively reduce the time required for the recording or the reading of the recording management data.

As described above, according to the embodiment of the information recording apparatus of the present invention, it is possible to preferably record the recording management data.

In one aspect of the embodiment of the information recording apparatus of the present invention, the first controlling device controls the recording device such that one group of recording management segments of the plurality of recording management segments is disposed in the first recording layer and that another group of recording management segments other than the one group of recording management segments of the plurality of recording management segments is disposed in the second recording layer.

According to this aspect, each of the plurality of recording management segments is preferably disposed in the single recording layer. By this, it is possible to receive the aforementioned various benefits.

Incidentally, the concept of "one group" and "another group" in the embodiment indicates that the plurality of recording management segments is divided into two (or three or more) groups, for example. Thus, obviously, the concept of "one group" and "another group" includes a group of recording management segments including the plurality of recording management segments and another group of recording management segments including only one recording management segment.

In another aspect of the embodiment of the information recording apparatus of the present invention, it is further provided with a second controlling device for controlling the recording device to record the recording management data into the recording management area in the second recording layer corresponding to a recording area in the first recording layer in which at least one of the user data and the recording management data is recorded.

According to this aspect, by the operation of the second controlling device, the recording management data is recorded into the recording management area in the second recording layer corresponding to (in other words, facing) the recording area in the first recording layer in which at least one of the user data and the recording management data is recorded. That is, in recording the recording management data into the recording management area in the second recording layer, it is possible to keep the recording status of the corresponding first recording layer (specifically, whether the user data or the recording management data is recorded or unrecorded). Thus, the recording quality of the recording management data recorded into the recording management area in the second recording layer is hardly changed in accordance with the recording status of the first recording layer. By this, it is possible to preferably record the recording management data into the recording management area in the second recording layer.

If such a second controlling device is not provided, the recording management data is recorded into the recording management area in the second recording layer without considering whether or not the user data or the recording management data is recorded. Therefore, if the recording is performed with the same laser beam, the recording status of the first recording layer causes the variable recording features of the recording management data recorded into the second recording layer, which is not preferable. On the other hand, in order to ensure the good recording features, it is necessary to change the recording power in accordance with the recording status of the first recording layer. However, it requires a certain amount of time to change the recording power. In the embodiment, however, there is a great advantage in that such a disadvantage can be eliminated.

In an aspect of the information recording apparatus provided with the second controlling device, as described above, the recording device may record the recording management data by irradiating a laser beam, and the second recording device may control the recording device to record the recording management data into the recording management area in the second recording layer by irradiating the laser beam through the recording area in the first recording layer in which at least one of the user data and the recording management data is recorded.

By virtue of such construction, the user data and the recording management data are recorded into the first recording layer by focusing the laser beam on the first recording layer. In the same manner, the user data and the recording management data are recorded into the second recording layer by focusing the laser beam on the second recording layer.

Then, the second controlling device controls the recording device to irradiate the laser beam through the recording area in the first recording layer in which at least one of the user data and the recording management data is recorded, if the recording management data is recorded into the second recording layer which is located on the rear side (or farther side) of the first recording layer viewed from the irradiation side of the laser beam, for example. In other words, the recording management data is hardly or not recorded at all into the second recording layer by irradiating the laser beam through the recording area in the first recording layer in which the user data and the recording management data are unrecorded. Therefore, without changing the condition of the laser beam to be irradiated, the recording management data can be preferably recorded throughout almost the entire recording management area in the second recording layer.

In an aspect of the information recording apparatus provided with the second controlling device, as described above, the second controlling device may control the recording device to record the recording management data such that an inner circumferential edge of the recording area in the first recording layer in which the recording management data is recorded and an inner circumferential edge of the recording area in the second recording layer in which the recording management data is recorded are at least a predetermined distance away.

By virtue of such construction, as described in detail later with using the drawings, in recording the recording management data into the recording management area in the second recording layer, it is possible to keep the recording status of the corresponding first recording layer. By this, it is possible to preferably record the recording management data into the recording management area in the second recording layer.

In an aspect of the information recording apparatus provided with the second controlling device, as described above, the second controlling device may control the recording device to record the recording management data such that an outer circumferential edge of the recording area in the first recording layer in which the recording management data is recorded and an outer circumferential edge of the recording area in the second recording layer in which the recording management data is recorded are at least a predetermined distance away.

By virtue of such construction, as described in detail later with using the drawings, in recording the recording management data into the recording management area in the second recording layer, it is possible to keep the recording status of the corresponding first recording layer. By this, it is possible to preferably record the recording management data into the recording management area in the second recording layer.

In an aspect of the information recording apparatus provided with the second controlling device, as described above, it may be further provided with a third controlling device for controlling the recording device to record dummy information as the recording management data into at least one portion of a recording area of the recording management area in the first recording layer in which the recording management data is unrecorded, the second controlling device controlling the recording device to record the recording management data such that an inner circumferential edge of the recording area in the first recording layer in which the dummy information is recorded and an inner circumferential edge of the recording area in the second recording layer in which the recording management is recorded are at least a predetermined distance away.

By virtue of such construction, by the operation of the third controlling device, the dummy information is recorded into at least one portion of the recording management area in the first recording layer. Thus, as described in detail later with using the drawings, regardless of an aspect of disposing the recording management segment in the recording management area in the second recording layer, it is possible to keep the recording status of the corresponding first recording layer in recording the recording management data into the recording management area in the second recording layer. By this, it is possible to preferably record the recording management data into the recording management area in the second recording layer.

In an aspect of the information recording apparatus provided with the second controlling device, as described above, it may be further provided with a third controlling device for controlling the recording device to record dummy information as the recording management data into at least one portion of a recording area of the recording management area in the first recording layer in which the recording management data is unrecorded, the second controlling device controlling the recording device to record the recording management data such that an outer circumferential edge of the recording area in the first recording layer in which the dummy information is recorded and an outer circumferential edge of the recording area in the second recording layer in which the recording management is recorded are at least a predetermined distance away.

By virtue of such construction, by the operation of the third controlling device, the dummy information is recorded into at least one portion of the recording management area in the first recording layer. Thus, as described in detail later with using the drawings, regardless of an aspect of disposing the recording management segment in the recording management area in the second recording layer, it is possible to keep the recording status of the corresponding first recording layer in recording the recording management data into the recording management area in the second recording layer. By this, it is possible to preferably record the recording management data into the recording management area in the second recording layer.

Embodiment of Information Recording Method

An embodiment of the information recording method of the present invention is an information recording method of recording user data and recording management data onto an information recording medium provided with: a first recording layer; and a second recording layer, each of the first recording layer and the second recording layer having a user data area to record therein at least the user data and a recording management area to record therein at least the recording management data for managing recording of the user data, the information recording method provided with: a recording process of dividing the recording management area into a plurality of recording management segments and for recording the recording management data into at least one of the plurality of recording management segments; and a first controlling process of controlling the recording process to dispose each of the plurality of recording management segments in a single recording layer.

According to the embodiment of the information recording method of the present invention, it is possible to receive the same various benefits as those of the embodiment of the information recording apparatus of the present invention.

Incidentally in response to the various aspects of the embodiment of the aforementioned information recording apparatus of the present invention, the embodiment of the information recording method of the present invention can employ various aspects.

Embodiment of Computer Program

An embodiment of the computer program of the present invention is a computer program for recording control and for controlling a computer provided in the aforementioned embodiment of the information recording apparatus of the present invention (including its various aspects), the computer program making the computer function as at least one portion of the recording device and the first controlling device.

According to the embodiment of the computer program of the present invention, the aforementioned embodiment of the information recording apparatus of the present invention (including its various aspects) can be relatively easily realized as a computer reads and executes the computer program from a program storage device, such as a ROM, a CD-ROM, a DVD- ROM, and a hard disk, or as it executes the computer program after downloading the program through a communication device.

Incidentally, in response to the various aspects of the aforementioned embodiment of the information recording apparatus of the present invention, the embodiment of the computer program of the present invention can also employ various aspects.

The above object of the present invention can be also achieved by an embodiment of a computer program product in a computer-readable medium for tangibly embodying a program of instructions executable by a computer provided in the aforementioned embodiment of the information recording apparatus of the present invention (including its various aspects), the computer program product making the computer function as at least one portion of the recording device and the first controlling device.

According to the embodiment of the computer program product of the present invention, the aforementioned embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information recording apparatus of the present invention.

Incidentally, in response to the various aspects of the aforementioned embodiment of the information recording apparatus of the present invention, the embodiment of the computer program product of the present invention can also employ various aspects.

Embodiment of Information Recording Medium

An embodiment of the information recording medium of the present invention is an information recording medium provided with: a first recording layer; and a second recording layer, each of the first recording layer and the second recording layer having a user data area to record therein at least the user data and a recording management area to record therein at least the recording management data for managing recording of the user data, wherein the second recording management area is divided into a plurality of recording management segments, the recording management data is recorded into one of the plurality of recording management segments, and an area to record therein the plurality of recording management segments is provided such that each of the plurality of recording management segments is disposed in a single layer.

According to the embodiment of the information recording medium of the present invention, it is possible to receive the same various benefits as those of the embodiment of the information recording apparatus of the present invention.

Incidentally, in response to the various aspects of the embodiment of the aforementioned information recording apparatus of the present invention, the embodiment of the information recording medium of the present invention can employ various aspects.

In one aspect of the embodiment of the information recording medium of the present invention, the area to record therein the plurality of recording management segments is provided such that one group of recording management segments of the plurality of recording management segments is disposed in the first recording layer and that another group of recording management segments other than the one group of recording management segments of the plurality of recording management segments is disposed in the second recording layer.

According to this aspect, each of the plurality of recording management segments is preferably disposed in the single recording layer. By this, it is possible to receive the aforementioned various benefits.

In another aspect of the embodiment of the information recording medium of the present invention, the area to record therein the plurality of recording management segments is provided so as to record the recording management data into the recording management area in the second recording layer corresponding to a recording area in the first recording layer in which at least one of the user data and the recording management data is recorded.

According to this aspect, the recording management data is recorded into the recording management area in the second recording layer corresponding to (in other words, facing) the recording area in the first recording layer in which at least one of the user data and the recording management data is recorded. That is, in recording the recording management data into the recording management area in the second recording layer, it is possible to keep the recording status of the corresponding first recording layer (specifically, whether the user data or the recording management data is recorded or unrecorded). Thus, the recording quality of the recording management data recorded into the recording management area in the second recording layer is hardly changed in accordance with the recording status of the first recording layer. By this, it is possible to preferably record the recording management data into the recording management area in the second recording layer.

In an aspect of the information recording medium in which the recording management data is recorded into the recording management area in the second recording layer corresponding to the recording area in the first recording layer in which at least one of the user data and the recording management data is recorded, as described above, the area to record therein the plurality of recording management segments may be provided so as to record the recording management data into the recording management area in the second recording layer by irradiating a laser beam through the recording area in the first recording layer in which at least one of the user data and the recording management data is recorded.

By virtue of such construction, the laser beam is irradiated through the recording area in the first recording layer in which at least one of the user data and the recording management data is recorded if the recording management data is recorded into the second recording layer located on the rear side (or farther side) of the first recording layer viewed from the irradiation side of the laser beam, for example. In other words, the recording management data is hardly or not recorded at all into the second recording layer by irradiating the laser beam through the recording area in the first recording layer in which the user data and the recording management data are unrecorded. Therefore, without changing the condition of the laser beam to be irradiated, the recording management data can be preferably recorded throughout almost the entire recording management area in the second recording layer.

In an aspect of the information recording medium in which the recording management data is recorded into the recording management area in the second recording layer corresponding to the recording area in the first recording layer in which at least one of the user data and the recording management data is recorded, as described above, the area to record therein the plurality of recording management segments may be provided so as to record the recording management data such that an inner circumferential edge of the recording area in the first recording layer in which the recording management data is recorded and an inner circumferential edge of the recording area in the second recording layer in which the recording management data is recorded are at least a predetermined distance away.

By virtue of such construction, as described in detail later with using the drawings, in recording the recording management data into the recording management area in the second recording layer, it is possible to keep the recording status of the corresponding first recording layer. By this, it is possible to preferably record the recording management data into the recording management area in the second recording layer.

In an aspect of the information recording medium in which the recording management data is recorded into the recording management area in the second recording layer corresponding to the recording area in the first recording layer in which at least one of the user data and the recording management data is recorded, as described above, the area to record therein the plurality of recording management segments may be provided so as to record the recording management data such that an outer circumferential edge of the recording area in the first recording layer in which the recording management data is recorded and an outer circumferential edge of the recording area in the second recording layer in which the recording management data is recorded are at least a predetermined distance away.

By virtue of such construction, as described in detail later with using the drawings, in recording the recording management data into the recording management area in the second recording layer, it is possible to keep the recording status of the corresponding first recording layer. By this, it is possible to preferably record the recording management data into the recording management area in the second recording layer.

In an aspect of the information recording medium in which the recording management data is recorded into the recording management area in the second recording layer corresponding to the recording area in the first recording layer in which at least one of the user data and the recording management data is recorded, as described above, dummy information may be recorded as the recording management data into at least one portion of a recording area of the recording management area in the first recording layer in which the recording management data is unrecorded, and the area to record therein the plurality of recording management segments may be provided so as to record the recording management data such that an inner circumferential edge of the recording area in the first recording layer in which the dummy information is recorded and an inner circumferential edge of the recording area in the second recording layer in which the recording management is recorded are at least a predetermined distance away.

By virtue of such construction, the dummy information is recorded into at least one portion of the recording management area in the first recording layer. Thus, as described in detail later with using the drawings, regardless of an aspect of disposing the recording management segment in the recording management area in the second recording layer, it is possible to keep the recording status of the corresponding first recording layer in recording the recording management data into the recording management area in the second recording layer. By this, it is possible to preferably record the recording management data into the recording management area in the second recording layer.

In an aspect of the information recording medium in which the recording management data is recorded into the recording management area in the second recording layer corresponding to the recording area in the first recording layer in which at least one of the user data and the recording management data is recorded, as described above, dummy information may be recorded as the recording management data into at least one portion of a recording area of the recording management area in the first recording layer in which the recording management data is unrecorded, and the area to record therein the plurality of recording management segments may be provided so as to record the recording management data such that an outer circumferential edge of the recording area in the first recording layer in which the dummy information is recorded and an outer circumferential edge of the recording area in the second recording layer in which the recording management is recorded are at least a predetermined distance away.

By virtue of such construction, the dummy information is recorded into at least one portion of the recording management area in the first recording layer. Thus, as described in detail later with using the drawings, regardless of an aspect of disposing the recording management segment in the recording management area in the second recording layer, it is possible to keep the recording status of the corresponding first recording layer in recording the recording management data into the recording management area in the second recording layer. By this, it is possible to preferably record the recording management data into the recording management area in the second recording layer.

These effects and other advantages of the present invention will become more apparent from the example explained below.

As explained above, according to the embodiment of the information recording apparatus of the present invention, it is provided with the recording device and the first controlling device. According to the embodiment of the information recording method of the present invention, it is provided with the recording process and the first controlling process. According to the embodiment of the computer program of the present invention, it makes a computer function as one portion of the recording device and the first controlling device. According to the embodiment of the information recording medium of the present invention, each of the plurality of recording management segments is disposed in the single recording layer. Therefore, it is possible to preferably record the recording management data.

EXAMPLE

Examples of the present invention will be explained on the basis of the drawings.

Firstly, with reference to FIG. 1, a description will be given on an optical disc 100 as an example of the information recording medium of the present invention. FIG. 1(*a*) is a substantial plan view showing the basic structure of the optical disc 100, and FIG. 1(*b*) is a schematic cross sectional view of the optical disc and its corresponding schematic conceptual view showing a recording area structure in the radial direction.

As shown in FIG. 1(*a*) and FIG. 1(*b*), the optical disc 100 has a recording surface on a disc main body with a diameter of about 12 cm, as is a DVD. On the recording surface, the optical disc 100 is provided with: a center hole 101 as being the center; a lead-in area 102 or a lead-out area 118; data areas 105 and 115, which constitute one specific example of the "user data area" of the present invention; and fixed middle areas 109 and 119. Then, in the optical disc 100, recording layers or the like are laminated on a transparent substrate 110, for example. In each recording area of the recording layers, a track or tracks, such as groove tracks and land tracks, are alternately placed, spirally or concentrically, centered on the center hole 101. Moreover, on the track, data is divided and recorded by a unit of ECC block. The ECC block is a data management unit by a pre-format address in which the record information can be error-corrected.

Incidentally, the present invention is not particularly limited to the optical disc having the three areas, as described above. For example, even if the lead-in area 102, the lead-out area 118 or the fixed middle areas 109 and 119 do not exist, a data structure and the like explained below can be constructed. Moreover, as described later, the lead-in area 102, the lead-out area 118 or the fixed middle areas 109 and 119 may be further segmentized.

In particular, the optical disc 100 in the example, as shown in FIG. 1(b), has such a structure that an L0 layer and an L1 layer, which constitute one example of the "first and second recording layers" of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of a laser beam LB, irradiated from the lower side to the upper side in FIG. 1(b). In particular, in the L0 layer, the data is recorded from the inner circumferential side to the outer circumferential side, while in the L1 layer, the data is recorded from the outer circumferential side to the inner circumferential side. In other words, the optical disc 100 in the example corresponds to an optical disc of an opposite track path type. However, even an optical disc of a parallel track path type can also receive various benefits described later, by adopting a structure discussed below.

Moreover, in the optical disc 100 in the example, in addition to the recording method in which the recording in the L1 layer is performed after the recording in the L0 layer, layer jump recording is also adopted in which data is recorded alternately into the L0 layer and the L1 layer. Specifically explaining the layer jump recording, the data is recorded into a partial recording area in the L0 layer before the data is recorded into a partial recording area in the L1 layer that faces the partial recording area in the L0 layer. After that, the data is recorded into another partial recording area in the L0 layer before the data is recorded into another partial recording area in the L1 layer that faces the another partial recording area in the L0 layer This operation is repeated subsequently.

Moreover, the data can be recorded a plurality of times onto the optical disc 100 in the example. That is, the recording area with the data once recorded can be overwritten with another data. Specifically, the optical disc 100 in the example is, for example, a DVD-RW.

Moreover, the optical disc 100 in the example is provided with recording management areas (RMA) 103 and 113 on the inner circumferential side of the lead-in area 102 and the lead-out area 118, respectively.

The RMA 103 and 113 are recording areas to record therein RMD (Recording Management Data) for managing the data recording onto the optical disc 100. The more specific data structure of the RMD will be detailed later (refer to FIG. 3 to FIG. 5).

Moreover, the optical disc 100 in the example is not limited to a dual-layer, single-sided type, i.e., a dual layer type, but may be a dual-layer, double-sided type. Furthermore, the optical disc 100 in the example is not limited to the optical disc having the two recording layers, as described above, but may be an optical disc of a multilayer type which has three or more layers.

Incidentally, the fixed middle area 109 and 119 have a function of preventing an optical pickup from jumping into an unrecorded area when the layer jump is performed after the data is recorded in all the data area 105 or 115 in order to change the recording layer into which the data is to be recorded. If the data is recorded only in one portion of the data areas 105 and 115, shifted middle areas 106 and 116 are used instead of the fixed middle area 105 and 115.

Now, with reference to FIG. 2, the shifted middle areas 106 and 116 will be explained. FIG. 2 is a schematic cross sectional view showing the optical disc, and its corresponding schematic conceptual view showing the recording area structure in the radial direction.

As shown in FIG. 2, the shifted middle area 106 is disposed in the data area 105, following the data recorded in one portion of the data area 105. In the same manner, the shifted middle area 116 is disposed in the data area 115, following the data recorded in one portion of the data area 115.

The disposing of the shifted middle areas 106 and 116 can prevent the optical pickup from jumping into the unrecorded area when the layer jump is performed, even if the data is recorded only in one portion of the data areas 105 and 115. Moreover, even when the layer jump is not performed, it is possible to prevent the optical pickup from jumping into an unrecorded area that is located on the outer circumferential side of the shifted middle areas 106 and 116. In addition, the disposing of the shifted middle areas 106 and 116 can conform the data structure on the optical disc 100 to a data structure on a read-only type optical disc, such as a DVD-ROM. Thus, a read-only type information reproducing apparatus can reproduce the data recorded on the optical disc 100.

That is, the shifted middle areas 106 and 116 have both a function of maintaining compatibility with the read-only type optical disc and a function of preventing the jump of the optical pickup, in the case that the data is recorded only in one portion of the data areas 105 and 115. In particular, in the case of layer jump recording, the data is recorded only in one portion of the data areas 105 and 115 in most cases. Therefore, the shifted middle areas 106 and 116 are effectively used particularly in the layer jump recording.

On the other hand, the fixed middle areas 109 and 119 have both a function of maintaining compatibility with the read-only type optical disc and a function of preventing the jump of the optical pickup, in the case that the data is recorded in all the data areas 105 and 115.

In the lead-in area 102, the lead-out area 118, the fixed middle areas 109 and 119, and the shifted middle areas 106 and 116, predetermined data (e.g. various control data, padding data, such as "00h", or the like) is recorded by performing a normal format process (in other words, a compatible close process) on the optical disc 100. Moreover, a quick format process for ensuring a data recordable area is also performed on the optical disc 100, in addition to the normal format process.

Next, with reference to FIG. 3 to FIG. 5, a description will be given on the specific data structure of the RMD to be recorded into the RMA 103 and 113. FIG. 3 is a data structure diagram conceptually showing the data structure of the RMD to be recorded into the RMA 103 and 113. FIG. 4 is a data structure diagram conceptually showing the data structure of each of fields which constitute the RMD, with regard to a format 2 and a format 3. FIG. 5 is a data structure diagram conceptually showing the data structure of a field 3 of the RMD in the format 3.

As shown in FIG. 3, a recording area obtained by combining the RMA 103 and the RMA 113 is divided into five RMA segments (#1 to #5), each of which constitutes one specific example of the "recording management segment" of the present invention. Each of the RMA segments (#1 to #5) has a size of 140 ECC blocks. Into each of the RMA segments (#1 to #5), 28 RMD sets (#1 to #28) can be recorded. Into each of the RMD sets (#1 to #28), five RMD blocks each having a size of 32 KB can be recorded. The five RMD blocks recorded in each of the RMD sets (#1 to #28) have the same content. In other words, the five RMD blocks indicating the same content are redundantly recorded into one RMD set. Each RMD block includes: a linking loss area with a size of 2 KB; and 15 fields (0 to 14) each of which has a size of 2 KB.

As shown in FIG. 4, in the optical disc in the example, format 2 RMD and format 3 RMD are recorded into the RMA 103 and the RMA 113. The format 2 RMD has a function of a pointer which indicates the position of the format 3 RMD that is valid (in other words, latest), and the format 3 RMD actually includes information for managing the data recording on the optical disc 100.

Specifically, as shown in FIG. 5, the format 2 RMD includes a linking loss area, common information, a pointer to the RMD set, and a reserved area.

The format 3 RMD includes a linking loss area, common information, OPC (Optimum Power Control) related information, user specific data, recording status information, a defect status bitmap, drive specific information, and disc testing area information.

The format 2 RMD is recorded into the RMD set #1 located at the head of each RMA segment, in order to indicate the valid format 3 RMD by using the pointer to the RMD set. The format 3 RMD is recorded into the RMD sets (#2 to #28) other than the RMD set #1 located at the head of each RMA segment.

Specifically, for example, if the normal format process or quick format process is performed on the blank optical disc 100, the format 3 RMD is recorded into the RMD set #2 (or the RMD sets #3 to #28) other than the RMD set #1 at the head of the RMA segment #1. Then, the format 2 RMD for pointing the position into which the format 3 RMD is recorded is recorded into the RMD set #1 at the head of the RMA segment #1.

As the data recording progresses in the data areas 105 and 115, the format 3 RMD is updated. The same RMD set #2 is overwritten with the format 3 RMD in each time of updating or in predetermined timing. After the overwriting is performed many times, a reading error starts to occur because of the overwriting beyond the upper limit of the number of writing times or because of scratches and dust, or the like. Then, if the format 3 RMD cannot be read in a plurality of RMD blocks of the five RDM blocks included in the RMD set #2, the format 3 RMD is newly recorded into the RMD set #3 other than the RMD set #2. In this case, the format 2 RMD is also updated in accordance with the change of the position into which the format 3 RMD is recorded, and it is written over the RMD set #1. After this, such an operation is performed on the RMD sets #3 to #28. Then, if it is judged that the format 3 RMD cannot be read in all the RMD sets of the RMA segment #1, the format 3 RMD is newly recorded into the RMD set #2 of the RMA segment #2, and the format 2 RMD is newly recorded into the RMD set #1 of the RMA segment #2. After this, such an operation is performed on the RMA segments #2 to #5.

Moreover, if the format 2 RMD cannot be read in a plurality of RMD blocks of the five RDM blocks included in the RMD set #1 of the RMA segment #1, the format 2 RMD and the format 3RMD are recorded by using the RMA segment #2. In this case, even if the format 3RMD can be read from any of the RMD sets #2 to #28 of the RMA segment #1, the format 2 RMD and the format 3 RMD are recorded by using the next RMA segment #2.

(Information Recording/Reproducing Apparatus)

Next, with reference to FIG. 6, a description will be given on an information recording/reproducing apparatus 200, as an example of the information reproducing apparatus of the present invention. FIG. 6 is a block diagram conceptually showing the basic structure of the information recording/reproducing apparatus 200 in the example. Incidentally, the information recording/reproducing apparatus 200 has a function of recording data onto an optical disc 100 and a function of reproducing the data recorded on the optical disc 100.

As shown in FIG. 6, the information recording/reproducing apparatus 200 is provided with: a disc drive 300 on which the optical disc 100 is actually loaded and on which data recording and data reproduction are performed; and a host computer 400, such as a personal computer, for controlling the data recording and reproduction with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the holographic recording medium 1. More specifically, the spindle motor 351 is adapted to rotate and stop the optical disc 100 at a predetermined speed, under spindle servo from a not-illustrated servo unit or the like.

The optical pickup 352 constitutes one specific example of the "recording device" of the present invention. The optical pickup 352 is provided with e.g. a not-illustrated semiconductor laser element, collimator lens, objective lens, and the like, in order to perform the recording and the reproduction on the optical disc 100. More specifically, the optical pickup 352 irradiates the optical disc 100 with a light beam, such as a laser beam, with a first power as reading light in the reproduction, and with a second power and with it modulated as writing light in the recording.

The signal recording/reproducing device 353 controls the spindle motor 351 and the optical pickup 352 under the control of the CPU 354, to thereby perform the recording and the reproduction on the optical disc 100. More specifically, the signal recording/reproducing device 353 is provided with e.g. a laser diode driver (LD driver), a head amplifier, and the like. The laser diode driver generates e.g. a driving pulse and drives the semiconductor laser element disposed in the optical pickup 352. The head amplifier amplifies an output signal of the optical pickup 352, i.e. reflected light of the light beam, and outputs the amplified signal.

The memory 355 is used in the general data processing and an OPC process on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as the recorder equipment, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Typically, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record, to the CPU 359. The CPU 359 may transmit a control command to the information recording/reproducing apparatus 200, through the data input/output control device 308, on the basis of instruction information from the operation/display control device 307, to thereby control the entire disc drive 300. In the same manner, the CPU 359 can transmit a command for requesting the disc drive 300 to transmit an operational status to the host, with respect to the disc drive 300. By this, the operational status of the disc drive 300, such as during recording, can be recognized, so that the CPU 359 can output the operational status of the disc drive 301 to the display panel 311, such as a fluorescent tube and an LCD, through the operation/display control device 307.

The memory 360 is an internal memory apparatus used by the host computer 400, and it is provided with: a ROM area in which a firmware program, such as BIOS (Basic Input/Output System), is stored; a RAM area in which variables necessary for the operation of an operating system and an application program or the like are stored; and the like. Moreover, the memory 360 may be connected to an external memory apparatus, such as a not-illustrated hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(Operation of Recording RMD)

Next, with reference to FIG. 7, a description will be given on an aspect of using the RMA 103 and 113 by the information recording/reproducing apparatus 200 in the example. FIG. 7 is a data structure diagram conceptually showing an aspect of using the RMA 103 and 113.

As shown in FIG. 7, the information recording/reproducing apparatus 200 in the example disposes the RMA segments #1 to #4 in the RMA 103, under the control of the CPU 354, which constitutes one specific example of the "first controlling device" of the present invention. Moreover, the information recording/reproducing apparatus 200 disposes a RMA lead-in area with a size of 1 ECC block, on the inner circumferential side of the RMA segments #1.

At this time, a recording area with a size of 68 ECC blocks is left in the RMA 103. However, the RMA segment #5 with a size of 140 ECC blocks cannot be disposed in the recording area with a size of 68 ECC blocks. Thus, the information recording/reproducing apparatus 200 in the example disposes the RMA segment #5 in the RMA 113, under the control of the CPU 354, which constitutes one specific example of the "first controlling device" of the present invention. That is, the information recording/reproducing apparatus 200 in the example disposes the entire RMA segment #5 in the RMA 113 without disposing the RMA segment #5 to bridge over the RMA 103 and the RMA 113. In other words, the information recording/reproducing apparatus 200 in the example disposes each RMA segment (#1 to #5 in the single recording layer.

Thus, for example, if the RMD is recorded using the RMA segments #1 to #4, the RMD can be recorded and the RMD can be read by accessing the RMA 103 in the L0 layer without accessing the RMA 113 in the L1 layer. More specifically, if the RMD is recorded in the RMA 103 in the L0 layer, it is only necessary to update the pointer in the RMA 103 in the L0 layer even if the RMD set for recording the RMD is changed. In the same manner, it is possible to read the RMD recorded in the L0 layer by reading the pointer recorded in the RMA 103 in the L0 layer. That is, the latest RMD and the pointer indicating the latest RMD are always recorded in the L0 layer. Thus, as long as the RMA segments #1 to #4 disposed in the RMA 103 in the L0 layer are used, it is unnecessary to perform the layer jump toward the L1 layer in order to record or read the RMD.

On the other hand, for example, if the RMD is recorded using the RMA segment #5, the RMD can be recorded and the RMD can be read by accessing the RMA 113 in the L1 layer without accessing the RAM 103 in the L0 layer. More specifically, if the RMD is recorded in the RMA 113 in the L1 layer, it is only necessary to update the pointer in the RMA 113 in the L1 layer even if the RMD set for recording the RMD is changed. In the same manner, it is possible to read the RMD recorded in the L1 layer by reading the pointer recorded in the RMA 113 in the L1 layer. That is, the latest RMD and the pointer indicating the latest RMD are always recorded in the L1 layer. Thus, as long as the RMA segment #5 disposed in the RMA 113 in the L1 layer are used, it is unnecessary to perform the layer jump toward the L0 layer in order to record or read the RMD.

As described above, since it is unnecessary to perform the layer jump in order to record or read the RMD, it is possible to relatively reduce a time required to record or read the RMD. That is, it is possible to record or read the RMD, relatively quickly.

In addition, since it is unnecessary to perform the layer jump in order to record or read the RMD, it is possible to record the pointer and the RMD into the same recording layer with the same recording power. Specifically, if the pointer and the RMD are simultaneously recorded, it is unnecessary to record the pointer into the RMA 103 with an optimum recording power in the L0 layer and to record the RMD into the RMA 113 with an optimum recording power in the L1 layer. In the same manner, if the pointer and the RMD are simultaneously recorded, it is unnecessary to record the RMD into the RMA 103 with an optimum recording power in the L0 layer and to record the pointer into the RMA 113 with an optimum recording power in the L1 layer. If the pointer and the RMD are simultaneously recorded, it is only necessary to record the pointer and the RMD into the RMA 103 in the L0 layer with the optimum power in the L0 layer. In the same manner, if the pointer and the RMD are simultaneously recorded, it is only necessary to record the pointer and the RMD into the RMA 113 in the L1 layer with the optimum power in the L1 layer. In the case that the pointer is recorded into the RMA 103 in the L0 layer and the RMD is recorded into the RMA 113 in the L1 layer, if only the optimum recording power in the L1 layer is recognized and the optimum recording power in the L0 layer is not recognized, it is necessary to calculate the optimum recording power in the L0 layer in order to record the pointer and the RMD. This requires a time to calculate the optimum recording power in the L0 layer, and this does not allow quick recording of RMD. However, in the example, such a disadvantage does not occur, and it is possible to relatively reduce the time required in recording or reading the RMD. That is, it is possible to record or read the RMD, relatively quickly.

Moreover, if the optical disc 100 in the example is a DVD-RW, for example, it is possible to dispose the five RMA segments in the RMA 103 and 113 in the same area as the RMA of a DVD-R in which data can be recorded only once. Thus, it is possible to preferably provide compatibility between the rewritable type optical disc 100 and the write-once type optical disc.

Incidentally, FIG. 7 shows a physical sector address, an ECC block address, and a radial position in the inner circumferential edge portion and the outer circumferential edge portion of each of the RMA 103 and 113, for reference.

Specifically, the physical sector address of the inner circumferential edge portion of the RMA 103 is "021CE0h", the ECC block address of the inner circumferential edge portion of the RMA 103 is "FFDE31h", and the radial position of the inner circumferential edge portion of the RMA 103 is 22.32 mm.

The physical sector address of the outer circumferential edge portion of the RMA 103 is "02442Fh", the ECC block address of the outer circumferential edge portion of the RMA 103 is "FFDBBDh", and the radial position of the outer circumferential edge portion of the RMA 103 is 22.62 mm.

The physical sector address of the inner circumferential edge portion of the RMA 113 is "FDB19Fh", the ECC block address of the inner circumferential edge portion of the RMA 113 is "0024E6h", and the radial position of the inner circumferential edge portion of the RMA 113 is 22.425 mm. That is, the inner circumferential edge portion of the RMA 113 and the inner circumferential edge portion of the RMA 103 are 0.105 mm away in the radial direction of the optical disc 100.

The physical sector address of the outer circumferential edge portion of the RMA 113 is "FDA5D0h", the ECC block address of the outer circumferential edge portion of the RMA 113 is "0025A2h", and the radial position of the outer circumferential edge portion of the RMA 113 is 22.515 mm. That is, the outer circumferential edge portion of the RMA 113 and the outer circumferential edge portion of the RMA 103 are 0.105 mm away in the radial direction of the optical disc 100.

Incidentally, in the RMA 103 in the L0 layer, the unrecorded area with a size of 68 ECC blocks is generated in which the RMD is not recorded. Thus, such a case is considered that the RMD is recorded into the RMA 113 in the L1 layer by irradiating the laser beam LB through the unrecorded area. However, in the optical disc 100 provided with the L0 layer and the L1 layer, in order to preferably maintain the recording features of the recorded data, the data is preferably recorded into the L1 layer by irradiating the laser beam LB through the L0 layer in which the data is recorded (hereinafter such a condition is referred to as a "recording order", as occasion demands).

Therefore, if each of the RMA segments (#1 to #5) is disposed in the single recording layer, as described above, it is preferable to record dummy data into the unrecorded area, which is generated in the RMA 103 in the L0 layer, in order to satisfy the recording order. Hereinafter, with reference to FIG. 8 to FIG. 11, a description will be given on aspects of recording the dummy data into the unrecorded area, which is generated in the RMA 103 in the L0 layer. FIG. 8 is a data structure diagram conceptually showing one aspect of recording the dummy data into the unrecorded area which is generated in the RMA 103 in the L0 layer. FIG. 9 is a cross sectional view conceptually showing an aspect of irradiating the laser beam LB when the RMD is recorded into the RMA 113 in the L1 layer in the condition of FIG. 8. FIG. 10 is a data structure diagram conceptually showing another aspect of recording the dummy data into the unrecorded area which is generated in the RMA 103 in the L0 layer. FIG. 11 is a data structure diagram conceptually showing another aspect of recording the dummy data into the unrecorded area which is generated in the RMA 113 in the L0 layer.

As shown in FIG. 8, if the RMA lead-in area and the RMA segment #5 to are disposed in this order from the edge portion on the outer circumferential side of the RMA 113, the dummy data, such as "00h" data, is recorded into the entire unrecorded area with a size of 68 ECC blocks, which is generated in the RMA 103 in the L0 layer, under the control of the CPU 354, which constitutes one specific example of the "second controlling device" and the "third controlling device" of the present invention.

Therefore, as shown in FIG. 9, under the control of the CPU 354, which constitutes one specific example of the "second controlling device" of the present invention, the laser beam LB is irradiated through the recording area in the L0 layer in which the RMD or the dummy data is recorded, and as a result, the RMD is recorded into the RMA 113, or predetermined data is recorded into the RMA lead-in area in the RMA 113. Therefore, it is possible to satisfy the recording order.

Incidentally, area portions on the both edges of the RMA 113 are preferably left without any data being recorded, because the recording order is not satisfied if the data recording is performed. That is, if the data recording is performed in the area portions on the both edges of the RMA 113, the recording order is not satisfied. Thus, the area portions are preferably not used as those for recording the data therein.

In addition, an area portion (e.g. referred to as a Drive Specific Area) with a size of 48 ECC blocks, located on the inner circumferential side of the RMA segment #5, in the RMA 113 is preferably left without any data being recorded.

Moreover, as shown in FIG. 10, if the RMA segment #5 and the RMA lead-in area are disposed to be adjacent to the edge portion on the inner circumferential side of the RMA 113, it is only necessary to record the dummy data into an unrecorded area with a size of 20 ECC blocks following the RMA segment #4, of the unrecorded area with a size of 68 ECC blocks, which is generated in the RMA 103 in the L0 layer, under the control of the CPU 354, which constitutes one specific example of the "second controlling device" of the present invention.

Even if the dummy data is recorded as described above, as in the case shown in FIG. 9, the laser beam LB is irradiated through the recording area in the L0 layer in which the RMD or the dummy data is recorded under the control of the CPU 354, which constitutes one specific example of the "second controlling device" of the present invention. As a result, the RMD is recorded into the RMA 113, or the predetermined data is recorded into the RMA lead-in area in the RMA 113. Therefore, it is possible to satisfy the recording order.

Even in this case, the area portion (i.e. the aforementioned drive specific area) with a size of 48 ECC blocks, located on the outer circumferential side of the RMA lead-in area, in the RMA 113 is preferably left without any data being recorded.

Moreover, as shown in FIG. 11, if the RMA segments #1 to #4 and the RMA lead-in area are disposed to be adjacent to the edge portion on the outer circumferential side of the RMA 103, it is only necessary to record the dummy data into an unrecorded area with a size of 20 ECC blocks following the RMA lead-in area, of the unrecorded area with a size of 68 ECC blocks, which is generated in the RMA 103 in the L0 layer, under the control of the CPU 354, which constitutes one specific example of the "second controlling device" of the present invention.

Even if the dummy data is recorded as described above, as in the case shown in FIG. 9, the laser beam LB is irradiated through the recording area in the L0 layer in which the RMD or the dummy data is recorded, under the control of the CPU 354, which constitutes one specific example of the "second controlling device" of the present invention. As a result, the RMD is recorded into the RMA 113, or the predetermined data is recorded into the RMA lead-in area in the RMA 113. Therefore, it is possible to satisfy the recording order.

Even in this case, the area portion (i.e. the aforementioned drive specific area) with a size of 48 ECC blocks, located on the inner circumferential side of the RMA segment #5, in the RMA 113 is preferably left without any data being recorded.

Incidentally, it is obvious that the arrangement of the RMA segments #1 to #5 is not limited to the examples shown in FIG. 8 to FIG. 11. Moreover, regardless of the arrangement of the RMA segments #1 to #5, it is preferable to record the dummy data such that the edge portion on the outer circumferential side of the RMA lead-in area in the RMA 113 and the edge portion on the outer circumferential side of the dummy data which is recorded on the outer circumferential side of the RMA segment #4 in the RMA 103 are at least 0.105 mm away (in other words, they are away by a distance corresponding to a size of about 220 ECC blocks) in the radial direction of the optical disc 100. In other words, the dummy data is preferably recorded such that the edge portion on the outer circumferential side of the recording area in which the RMD or the like is recorded in the RMA 113 and the edge portion on the outer circumferential side of the recording area in which the RMD or the like and the dummy data are recorded in the RMA 103 are at least 0.105 mm away in the radial direction of the optical disc 100. In the same manner, the dummy data is recorded such that the edge portion on the inner circumferential side of the RMA segment #5 in the RMA 113 and the edge portion on the inner circumferential side of the dummy data recorded on the inner circumferential side of the RMA lead-in area in the RMA 103 are at least 0.105 mm away in the radial direction of the optical disc 100. In other words, the dummy data is preferably recorded such that the edge portion on the inner circumferential side of the recording area in which the RMD or the like is recorded in the RMA 113 and the edge portion on the inner circumferential side of the recording area in which the RMD or the like and the dummy data are recorded in the RMA 103 are at least 0.105 mm away in the radial direction of the optical disc 100. The recording order can be satisfied by recording the dummy data as described above.

Moreover, the recording of the dummy data may be performed after it is judged that the RMD cannot be read with regard to all the RMD sets of the RMA segment #4 and before the RMD is newly recorded into the RMA segment #5.

Alternatively, the dummy data may be recorded when the RMD is recorded by using the RMA segments #1 to #4 and when it is in a stand-by status in which the operation of recording or reading the RMD and the user data is not performed. By this, it is possible to record the dummy data when the information recording/reproducing apparatus 200 does not have a high processing load, and the RMD can be recorded by using the RMA segment #5 immediately after it is judged that the RMA segment 44 cannot be used.

Moreover, the dummy data could be recorded only into one portion of the unrecorded area in some cases, depending on how long the stand-by status is. In this case, the dummy data may be recorded selectively only into the recording area in which the dummy data is already recorded, in each time of the stand-by status. Alternatively, the dummy data may be recorded into the entire unrecorded area in each time of the stand-by status.

Moreover, considering that the optical disc 100 can be loaded on the information recording/reproducing apparatus 200, the information recording/reproducing apparatus 200 on which the optical disc 100 is loaded for the first time may record the dummy data. By this, another information recording/reproducing apparatus 200 other than the information recording/reproducing apparatus 200 on which the optical disc 100 is loaded does not have to record the dummy data.

Incidentally, the aforementioned example explains that the RMA segments are disposed and the dummy data is recorded by the recording operation of the information recording/reproducing apparatus 200; however, the RMA segments may be disposed in the aforementioned aspect in advance upon the manufacturing of the optical disc 100. In the same manner, the dummy data may be recorded in the aforementioned aspect in advance upon the manufacturing of the optical disc 100. It is obvious that such an optical disc 100 is also included in the scope of the present invention.

Incidentally, in the aforementioned example, an explanation is given using the dual-layer type optical disc 100; however, not only the dual-layer type optical disc 100 but also a single-layer type optical disc with a single recording layer and an optical disc with three or more recording layers can also receive the aforementioned various benefits by adopting the aforementioned various structures.

Incidentally, in the aforementioned example, an explanation is given on the optical disc 100 as one example of the information recording medium and the recorder related to the optical disc 100 as one example of the information recording apparatus; however, the present invention is not limited to the optical disc and the recorder thereof, and it can be also applied to other various information recording media which support high-density recording or high transmission rate, and recorders thereof.

The present invention is not limited to the aforementioned embodiment, but various changes may be made, if desired, without departing from the essence or spirit of the invention which can be read from the claims and the entire specification. An information recording medium, an information recording apparatus and method, and a computer program, all of which involve such changes, are also intended to be within the technical scope of the present invention.

INDUSTRIAL APPLICABILITY

The information recording medium, the information recording apparatus and method, and the computer program according to the present invention can be applied to an information recording medium, such as a DVD, and an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus for recording user data and recording management data onto an information recording medium comprising: a first recording layer; and a second recording layer, each of the first recording layer and the second recording layer having a user data area to record therein at least the user data and a recording management area to record therein at least the recording management data for managing recording of the user data, said information recording apparatus comprising:

a recording device for dividing the recording management area into a plurality of recording management segments and for recording the recording management data into at least one of the plurality of recording management segments;

a first controlling device for controlling said recording device to dispose each of the plurality of recording management segments in a single recording layer;

a second controlling device for controlling said recording device to record the recording management data into the recording management area in the second recording layer corresponding to a recording area in the first recording layer in which at least one of the user data and the recording management data is recorded; and a third controlling device for controlling said recording device to record dummy information as the recording management data into at least one portion of a recording area of the recording management area in the first recording layer in which the recording management data is unrecorded, said second controlling device controlling said recording device to record the recording management data such that an outer circumferential edge of the recording area in the first recording layer in which the dummy information is recorded and an outer circumferential edge of the recording area in the second recording layer in which the recording management is recorded are at least a predetermined distance away.

2. The information recording apparatus according to claim 1, wherein said first controlling device controls said recording device such that one group of recording management segments of the plurality of recording management segments is disposed in the first recording layer and that another group of recording management segments other than the one group of recording management segments of the plurality of recording management segments is disposed in the second recording layer.

3. The information recording apparatus according to claim 1, wherein said recording device records the recording management data by irradiating a laser beam, and said second controlling device controls said recording device to record the recording management data into the recording management area in the second recording layer by irradiating the laser beam through the recording area in the first recording layer in which at least one of the user data and the recording management data is recorded.

4. The information recording apparatus according to claim 1, wherein said second controlling device controls said recording device to record the recording management data such that an inner circumferential edge of the recording area in the first recording layer in which the recording management data is recorded and an inner circumferential edge of the recording area in the second recording layer in which the recording management data is recorded are at least a predetermined distance away.

5. The information recording apparatus according to claim 1, wherein said second controlling device controls said recording device to record the recording management data such that an outer circumferential edge of the recording area in the first recording layer in which the recording management data is recorded and an outer circumferential edge of the recording area in the second recording layer in which the recording management data is recorded are at least a predetermined distance away.

6. The information recording apparatus according to claim 1, further comprising a third controlling device for controlling said recording device to record dummy information as the recording management data into at least one portion of a recording area of the recording management area in the first recording layer in which the recording management data is unrecorded, said second controlling device controlling said recording device to record the recording management data such that an inner circumferential edge of the recording area in the first recording layer in which the dummy information is recorded and an inner circumferential edge of the recording area in the second recording layer in which the recording management is recorded are at least a predetermined distance away.

7. An information recording method of recording user data and recording management data onto an information recording medium comprising: a first recording layer; and a second recording layer, each of the first recording layer and the second recording layer having a user data area to record therein at least the user data and a recording management area to record therein at least the recording management data for managing recording of the user data, said information recording method comprising:

a recording process of dividing the recording management area into a plurality of recording management segments and for recording the recording management data into at least one of the plurality of recording management segments;

a first controlling process of controlling said recording process to dispose each of the plurality of recording management segments in a single recording layer;

a second controlling process of controlling said recording process to record the recording management data into the recording management area in the second recording layer corresponding to a recording area in the first recording layer in which at least one of the user data and the recording management data is recorded; and a third controlling process of controlling said recording process to record dummy information as the recording management data into at least one portion of a recording area of the recording management area in the first recording layer in which the recording management data is unrecorded, said second controlling process controlling said recording process to record the recording management data such that an outer circumferential edge of the recording area in the first recording layer in which the dummy information is recorded and an outer circumferential edge of the recording area in the second recording layer in which the recording management is recorded are at least a predetermined distance away.

8. An information recording medium comprising: a first recording layer; and a second recording layer, each of the first recording layer and the second recording layer having a user data area to record therein at least the user data and a recording management area to record therein at least the recording management data for managing recording of the user data, wherein said second recording management area is divided into a plurality of recording management segments, the recording management data is recorded into one of the plurality of recording management segments, an area to record therein the plurality of recording management segments is provided such that each of the plurality of recording management segments is disposed in a single layer, the area to record therein the plurality of recording management segments is provided so as to record the recording management data into the recording management area in the second recording layer corresponding to a recording area in the first recording layer in which at least one of the user data and the recording management data is recorded, dummy information is recorded as the recording management data into at least one portion of a recording area of the recording management area in the first recording layer in which the recording management data is unrecorded, and the area to record therein the plurality of recording management segments is provided so as to record the recording management data such that an outer circumferential edge of the recording area in the first recording layer in which the dummy information is recorded and an outer circumferential edge of the recording area in the second recording layer in which the recording management is recorded are at least a predetermined distance away.

9. The information recording medium according to claim 8, wherein the area to record therein the plurality of recording management segments is provided such that one group of recording management segments of the plurality of recording management segments is disposed in the first recording layer and that another group of recording management segments other than the one group of recording management segments of the plurality of recording management segments is disposed in the second recording layer.

10. The information recording medium according to claim 8, wherein the area to record therein the plurality of recording management segments is provided so as to record the recording management data into the recording management area in the second recording layer by irradiating a laser beam through the recording area in the first recording layer in which at least one of the user data and the recording management data is recorded.

11. The information recording medium according to claim 8, wherein the area to record therein the plurality of recording management segments is provided so as to record the recording management data such that an inner circumferential edge of the recording area in the first recording layer in which the recording management data is recorded and an inner circumferential edge of the recording area in the second recording layer in which the recording management data is recorded are at least a predetermined distance away.

12. The information recording medium according to claim 8, wherein the area to record therein the plurality of recording management segments is provided so as to record the recording management data such that an outer circumferential edge of the recording area in the first recording layer in which the recording management data is recorded and an outer circumferential edge of the recording area in the second recording layer in which the recording management data is recorded are at least a predetermined distance away.

13. The information recording medium according to claim 8, wherein dummy information is recorded as the recording management data into at least one portion of a recording area of the recording management area in the first recording layer in which the recording management data is unrecorded, and the area to record therein the plurality of recording management segments is provided so as to record the recording management data such that an inner circumferential edge of the recording area in the first recording layer in which the dummy information is recorded and an inner circumferential edge of the recording area in the second recording layer in which the recording management is recorded are at least a predetermined distance away.

* * * * *